(12) United States Patent
Nicholls et al.

(10) Patent No.: US 9,468,192 B2
(45) Date of Patent: Oct. 18, 2016

(54) ANIMAL ENCLOSURE

(75) Inventors: Simon Nicholls, Oxfordshire (GB); James Tuthill, Oxfordshire (GB); Johannes Paul, London (GB); William Windham, Oxfordshire (GB)

(73) Assignee: HEBE STUDIO LIMITED, Oxfordshire (GB)

(*) Notice: Subject to any disclaimer, the term of this patent is extended or adjusted under 35 U.S.C. 154(b) by 245 days.

(21) Appl. No.: 14/238,513

(22) PCT Filed: Aug. 13, 2012

(86) PCT No.: PCT/EP2012/065790
§ 371 (c)(1),
(2), (4) Date: Feb. 12, 2014

(87) PCT Pub. No.: WO2013/024062
PCT Pub. Date: Feb. 21, 2013

(65) Prior Publication Data
US 2014/0196667 A1  Jul. 17, 2014

(30) Foreign Application Priority Data

Aug. 12, 2011  (GB) .................................. 1113891.4

(51) Int. Cl.
*A01K 1/00*   (2006.01)
*A01K 1/03*   (2006.01)

(52) U.S. Cl.
CPC ..................................... *A01K 1/03* (2013.01)

(58) Field of Classification Search
CPC ........ A01K 1/00; A01K 1/0035; A01K 1/03; A01K 1/031
USPC ........ 119/416–422, 428, 430, 436, 452, 455, 119/456, 459, 472, 473, 478
See application file for complete search history.

(56) References Cited

U.S. PATENT DOCUMENTS 2,467,525 A * 4/1949 Fricke .................. A01K 1/0356
119/417
3,122,127 A * 2/1964 Shechmeister ........ A01K 1/031
119/417
3,304,913 A * 2/1967 Nesher .................. A01K 1/031
119/419
3,537,428 A * 11/1970 Montgomery ......... A01K 1/031
119/419
3,865,082 A * 2/1975 Lovitz .................... A01K 1/035
119/452
3,958,534 A * 5/1976 Perkins .................... A01K 1/03
119/455
5,092,269 A * 3/1992 Phillips .................... A01K 1/03
119/452
5,186,122 A * 2/1993 Phillips .................... A01K 1/03
119/474
6,044,799 A * 4/2000 Tominaga .............. A01K 1/035
119/452

(Continued)

OTHER PUBLICATIONS

PCT/EP2012/065790, International Search Report, Feb. 1, 2013, European Patent Office, P.B. 5818 Patentlaan 2, NL—2280 HV Rijswijk.

*Primary Examiner* — Richard Price, Jr.
(74) *Attorney, Agent, or Firm* — The Jansson Firm; Pehr B. Jansson

(57) ABSTRACT

An enclosure (1) for small animals, the enclosure comprising: an internal wall (17) that divides a space within the enclosure (1) into first (5) and second (7) regions, and a passageway (13) mounted in said internal wall (17) to extend between said regions (5, 7) so that an animal within the enclosure can pass between the first and second regions of the space; wherein the passageway (13) is movable relative to said internal wall (17) between a first operating mode in which an animal within the enclosure is able to pass between said regions and a second operating mode in which the animal is obstructed from passing between said regions.

25 Claims, 5 Drawing Sheets

(56) References Cited

U.S. PATENT DOCUMENTS

| | | | | |
|---|---|---|---|---|
| 6,062,171 | A * | 5/2000 | Tominaga | A01K 1/03 119/455 |
| 6,067,939 | A * | 5/2000 | Tominaga | A01K 1/03 119/474 |
| 8,047,160 | B2 * | 11/2011 | Tamborini | A01K 1/031 119/417 |
| 2011/0061603 | A1 | 3/2011 | Ragonetti et al. | |
| 2014/0196667 | A1 * | 7/2014 | Nicholls | A01K 1/03 119/482 |

* cited by examiner

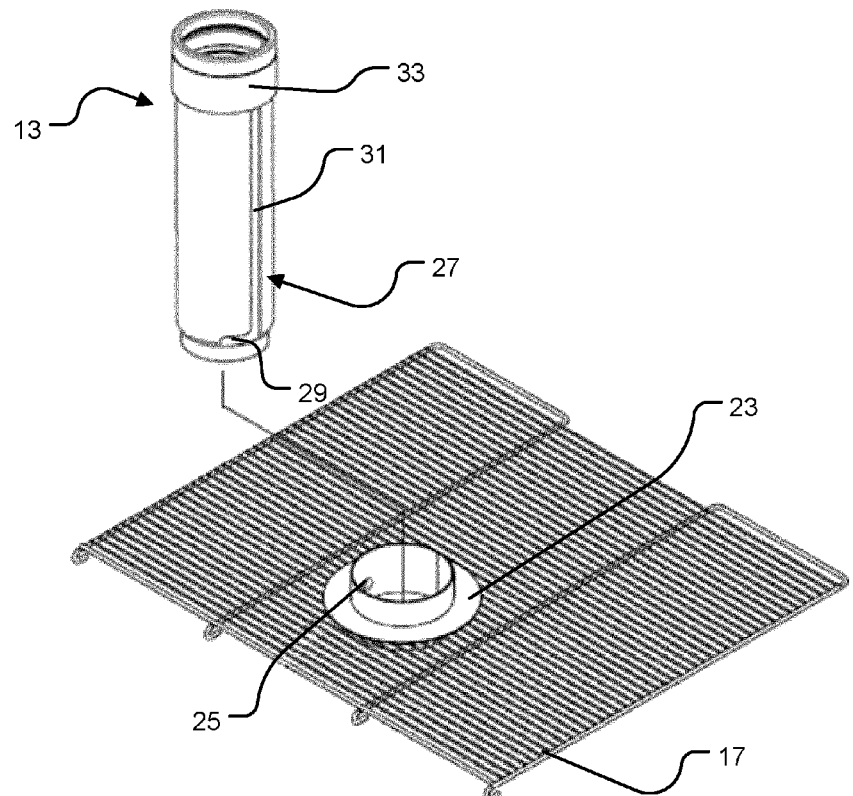
Fig. 2
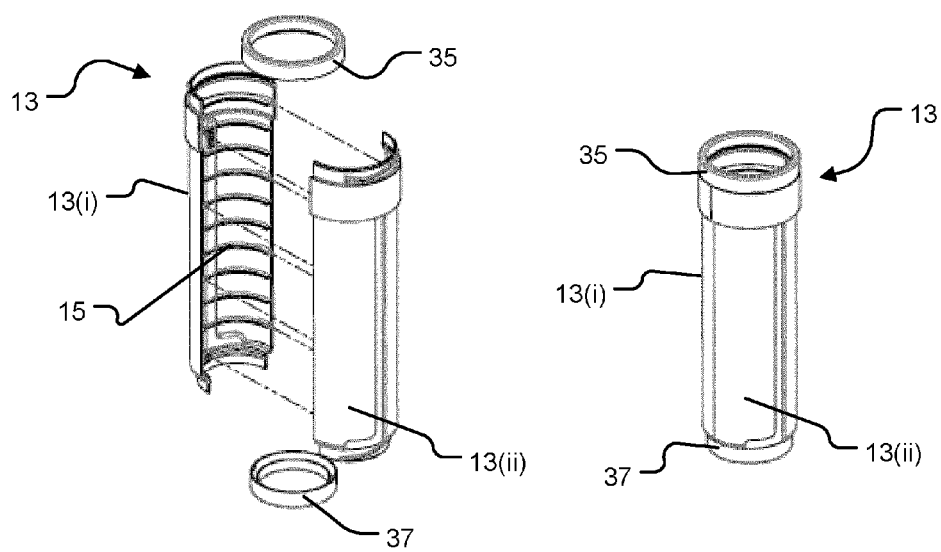
Fig. 3                    Fig. 4

ANIMAL ENCLOSURE

FIELD OF THE INVENTION

This invention relates to animal enclosures, particularly—but not exclusively—to enclosures for small animals, such as hamsters, gerbils, mice, rats and the like, that are often kept as pets.

BACKGROUND TO THE INVENTION

Children, in particular, have long had an affinity for small furry animals, and it is not uncommon for parents—typically after much pestering—to allow their children to keep such animals as pets. A typical bargain struck between parents and children is that the children in question can have such an animal as a pet only if they undertake to clean out the animal's cage on a regular basis.

Whilst the child's interest in the animal is maintained such bargains tend work well, but it is often the case that the child loses interest whereupon it falls to the parents to clean out the animal's cage. The parents may not be particularly interested in the animal, and in some instances the parents may have an active dislike of the animal in question.

In such circumstances, the parents are faced with having to come into contact with an animal that they are not particularly fond of on a regular basis, and this can often be quite traumatic for the parent. In extreme cases, the parent's dislike of the animal may cause them to neglect the animal, or even to seek to re-home the animal with another family, and this can have repercussions for the well being of the animal in question.

Currently available enclosures for small animals tend to exacerbate such problems in that it is often the case that one cannot access the cage to clean it out without coming into contact with the animal. It would therefore be an advantage if an enclosure could be provided that enabled the animal to be segregated in one part of the enclosure whilst the other part is cleaned.

Another problem associated with traditional animal enclosures is that they are not particularly attractive to look at. Since such enclosures are generally on view in a household, it would be preferable for the enclosure to be more attractive, in particular to look more like a piece of furniture.

One previously proposed enclosure is disclosed in U.S. Pat. No. 3,958,534. The enclosure disclosed in this patent is from the well-known Rotastak™ family of enclosures, and comprises a round main housing that is coupled to an upper chamber by a climbing tube that projects into the main housing. The main housing is in two sections that are fitted together so that the top section can rotate relative to the bottom section. The floor of the bottom section of the main housing includes a boss that projects into the main housing, and the top section can be rotated relative to the bottom section so that the tube coupled to the upper chamber aligns with the boss. In this position an animal in the upper chamber cannot get into the main housing (and vice versa).

Whilst this arrangement does indeed function adequately to confine the animal to one chamber or the other, it will be apparent that the keeper of the animal cannot disassemble the main housing for cleaning when the animal is in the upper chamber, as the animal will then be able to escape. Since this chamber is the chamber most likely to be soiled by the animal, this represents a significant disadvantage.

One aim of the present invention is to address these shortcomings in the prior art.

SUMMARY OF THE INVENTION

To this end, a presently preferred implementation of the teachings of the invention provides an enclosure for small animals, the enclosure comprising: an internal wall that divides a space within said enclosure into first and second regions, and a passageway mounted in said internal wall to extend between said regions so that an animal within the enclosure can pass between the first and second regions of said space; wherein said passageway is movable relative to said internal wall between a first operating mode in which an animal within the enclosure is able to pass between said regions and a second operating mode in which the animal is obstructed from passing between said regions.

By virtue of this arrangement, a parent—for example—can lure an animal within the enclosure into one of said regions and then reconfigure the passageway so that the animal is confined within said one region. The parent can then clean out the other region of the enclosure without having to make contact with the confined animal. Once the other region of the enclosure has been cleaned the parent can then reconfigure the passageway to enable the animal to pass freely between said regions once more, again without having to make contact with the animal.

In a preferred embodiment, the enclosure is configured so that an animal contained therein may be confined to said first region or said second region when the passageway is in said second operating mode. This is distinctly different from the arrangement disclosed in the aforementioned prior art document where the animal cannot be confined in the upper chamber when the main housing is opened for cleaning.

In another implementation, the present invention provides an enclosure for small animals, the enclosure comprising first and second regions, and a passageway between said regions that is reconfigurable between first and second operating modes, wherein in said first operating mode an animal within the enclosure is able to pass between said regions and in said second operating mode the animal is obstructed from passing between said regions.

In one configuration an animal within the enclosure may traverse the passageway to pass between said first and second regions when the passageway is in said first operating mode.

The passageway may comprise an axial bore through which an animal may pass when the passageway is in said first operating mode. The passageway may be suspended from the wall that divides said space into said first and second regions. The passageway may be able to slide through said internal wall as it moves between said first and second operating modes.

The first region is preferably above said second region when the enclosure is in an upright orientation. Preferably the passageway extends substantially vertically between the first and second regions. In one envisaged implementation, in the first operating mode the passageway extends further into the second region than into the first region; and in the second operating mode the passageway extends further into the first region than into the second region.

Preferably said internal wall defines a lower part of the first region and an upper part of the second region. Preferably the passageway extends through an opening defined in said internal wall.

In one arrangement the internal wall is provided with a first part of a two part engagement mechanism and said passageway is provided with a second part of said two part engagement mechanism. Preferably in a first configuration of the two part engagement mechanism the passageway is able to be rotated relative to said internal wall, and in a second configuration of the two part engagement mechanism the passageway is restricted from being rotated relative to said internal wall.

The first part of the two part engagement mechanism may comprise part of a collar secured in the opening in said internal wall. The second part of the two part engagement mechanism may comprise a groove defined in an outer wall of said passageway. The groove may be substantially L-shaped.

Preferably the passageway is substantially tubular in shape.

Preferably the passageway comprises a plurality of separable parts. The separable parts of the passageway may be held together by one or more rings. An interior surface of the passageway may be provided with one or more ribs.

In one implementation the first region is at least partly defined by a frame that defines the space in which said internal wall is located.

In one implementation the passageway is able to pivot relative to said internal wall as it moves between said first and second operating modes. In this implementation the passageway may comprise a planar panel that is pivotally coupled at one end to said internal wall, said panel being moveable to open or close an aperture in said wall.

In another implementation, the teachings of the invention provide an enclosure for small animals, the enclosure comprising: first and second regions, and means operable to confine an animal within said enclosure to one of said first and second regions.

In another implementation, the teachings of the invention provide an enclosure for small animals, the enclosure comprising: an internal wall that divides a space within said enclosure into first and second regions, and a passageway mounted in said internal wall to extend between said regions so that an animal within the enclosure can pass between the first and second regions of said space; wherein said passageway is movable relative to said internal wall between a first operating mode in which an animal within the enclosure is able to pass between said regions and a second operating mode in which the animal is obstructed from passing between said regions and is confined to one or other of said regions.

Other features and advantages of the teachings of the invention, and arrangements implementing those teachings are set forth in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIG. 2 is a schematic perspective view of part of the enclosure depicted in FIG. 1;

FIG. 3 is an exploded view of a component depicted in FIG. 2;

FIG. 4 is a perspective view of the component depicted in FIG. 3 once assembled;

DETAILED DESCRIPTION OF PREFERRED EMBODIMENTS

Figure 1:
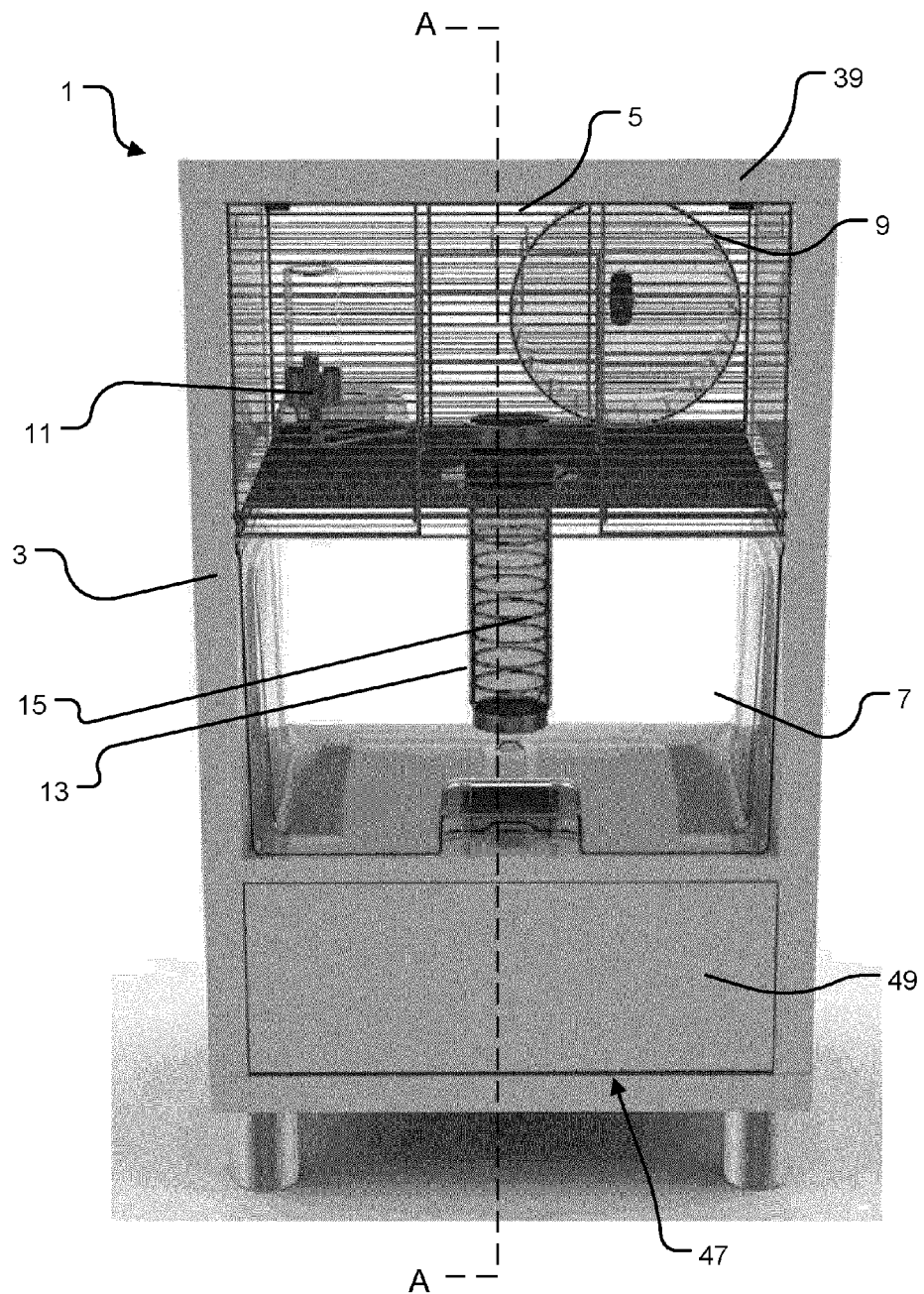
FIG. 1 is a schematic front view of an animal enclosure implementing the teachings of the present invention.

FIG. 1 is a schematic front view of an animal enclosure 1 that implements the teachings of the present invention. The animal enclosure 1 comprises, in this arrangement, a frame 3 inside of which there is provided a first region 5 and a second region 7. In this particular arrangement, the first region is provided above the second, but it will be appreciated that the regions could instead be provided alongside one another (in which case the passageway between regions that is referenced below would move horizontally instead of generally vertically). It will also be appreciated that in this particular arrangement the regions are each formed as discrete compartments, but in other implementations the regions could instead comprise parts of one compartment.

In this implementation the second region 7 functions as a bedding area that is normally filled with appropriate bedding material, such as straw or sawdust. In FIG. 1, however, the second region 7 is shown empty so that the features of the enclosure can more readily be appreciated. The first region 5 functions as a run area that the animal can explore, and in which the animal can exercise and be fed. To this end, in this particular arrangement the first region 5 has been provided with an exercise wheel 9 and a water bottle 11.

The first and second regions 5, 7 are joined one to the other by a passageway 13 that comprises, in this particular arrangement, a hollow tube 13. As will later be described in more detail, the hollow tube includes a plurality of internal circumferential ribs 15 that help the animal to move between the first and second regions.

In this particular arrangement, the second region 7 comprises a floor, and front, rear and two sidewalls that extend upwardly from the floor to form a container that is open at one end (in this instance its upper end). The first region, in contrast, is defined—in this arrangement—in part by the frame 3 and in part by a floor 17, a front wall 19 and a rear wall 21 (not labelled in FIG. 1, but shown in FIG. 7). Conveniently the walls defining the second region 7 are solid so that bedding material cannot escape, and in a particularly preferred arrangement the walls defining the second region may be of a clear plastics material (such as a polycarbonate) that allows the animal to be observed through the walls.

In contrast, in a preferred arrangement at least the front and rear walls of the first region 5 are formed from a mesh material (for example from a metal wire mesh) so that the owner can interact with the animal (for example by feeding it) through the walls of the second region, and so that items such as exercise wheels and water bottles can be hung from the walls. The floor of the first region 5 may also be of a mesh material, although it is preferred for the floor to be solid so that food cannot fall into the second region from the first. In another envisaged arrangement, the floor of the first region may be of a mesh material and may support a removable solid tray to catch any food that might be spilt by the animal.

In this arrangement, the passageway 13 is suspended from the floor 17 of the first region 5 so that one end of the passageway 13 projects partway (for example 5 to 15 centimetres) into the first compartment 5, and the other end of the passageway 13 terminates a short distance (for example 10 to 20 centimetres) above the floor of the second region 7.

As shown in FIG. 2, the floor 17 of the first region 5 includes an aperture into which an annular collar 23 has been fitted. The collar 23 is sized to permit the passageway to slide upwardly and downwardly through it, and includes a pair of diametrically opposite inwardly projecting pegs 25 (one of which is visible in FIG. 2). Each peg 25 is configured to slide within one of a pair of diametrically opposite L-shaped grooves 27 formed in the outer peripheral surface of the passageway 13. As will be appreciated, when the pegs 25 are located in a transversely extending part 29 of the grooves 27 the passageway 13 is supported on the pegs 25 and extends upwardly from the floor 17. In this position the passageway 13 is in a second operating mode where an animal in the enclosure is obstructed from passing between the first and second regions. When the passageway is rotated relative to the collar 23, the pegs 25 move from the transversely extending part 29 of the grooves 27 to a vertically (at least generally) extending part 31, and the passageway can move downwardly through the annular collar 23 mounted in the floor 17 until the pegs 25 abut against a head portion 33 of the passageway 13 that abuts against the collar 23 when the majority of the passageway 13 extends beneath the floor 17. In this position the passageway 13 is in a first operating mode where an animal in the enclosure is able to pass between the first and second regions.

The pegs 25 and co-operating grooves 27 form a "bayonet" style interlock between the passageway 13 and the collar 23 that allows the passageway 13 to be moved upwardly and downwardly relative to the floor 17 (when the pegs are aligned with the vertically extending parts 31 of the grooves 27) and to be locked in a position where the passageway extends upwardly from the floor 17 by rotating the passageway 13 relative to the floor so that the pegs 25 move into the laterally extending parts 29 of the grooves 31.

In this implementation the passageway 13 is formed as a one-piece unit, but in another implementation the passageway 13 may be formed from a number of discrete parts so that it may be disassembled to facilitate cleaning. Referring now to FIGS. 3 and 4, in this implementation the passageway comprises two passageway halves 13(i) and 13(ii) that are each provided with a plurality of internal projections that cooperate, when the halves are joined, to form the aforementioned ribs 15. The two passageway halves 13(i) and 13(ii) are held together by means of retaining rings 35, 37 that twist-lock (in this particular arrangement) onto respective ends of the tube formed by the passageway halves to keep the halves together (as shown in FIG. 4). To disassemble the passageway 13, one need only twist and unlock the retaining rings, whereupon the rings can be removed and the passageway halves separated for cleaning.

Figure 5:
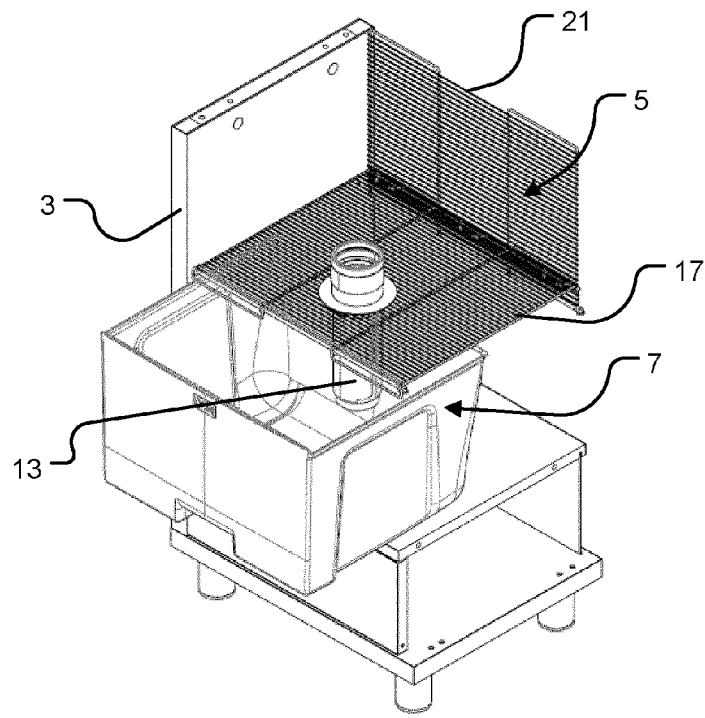
FIG. 5 is a schematic, partly cut-away, view of the animal enclosure.
Figure 6:
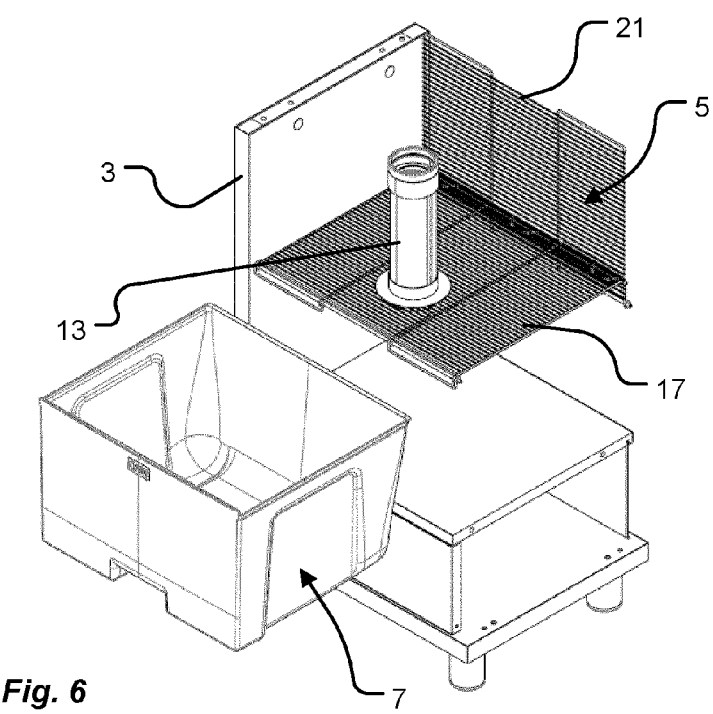
FIG. 6 is another schematic, partly cut-away, view of the animal enclosure.

Referring now to FIGS. 5 and 6, when the passageway 13 is in the first operating mode (FIG. 5), the container that forms the second region 7 can be pulled partway out of the frame 3 (shown partly cut-away) until the passageway 13 bears against the rear wall of the second region. The user can then reach into the second region 7, move the passageway 13 upwardly into the first region 5 and twist the passageway so that the pegs 25 move into the laterally extending parts 29 of the grooves 31, whereupon the passageway is supported on the pegs and is in the aforementioned second operating mode. In this position the container that forms the second region 7 can be taken out of the frame 3 for cleaning. If the user lures the animal into the first region 5 before manipulating the passageway 13, the user can access the second region 7 without having to interact with the animal.

In one envisaged implementation the uppermost end of the passageway 13 may be configured to be close to or bear against an internal wall of the frame 3 when the passageway is in the second operating mode in order to prevent an animal in the first region 5 from passing through the passageway 13 to the second region 7. In another envisaged implementation the outer wall of the passageway may be smooth (so that an animal cannot grip and climb the passageway) and the passageway may project sufficiently far into the first region 5 to prevent an animal from climbing up and into the passageway 13 when it is in the second operating mode.

Figure 7:
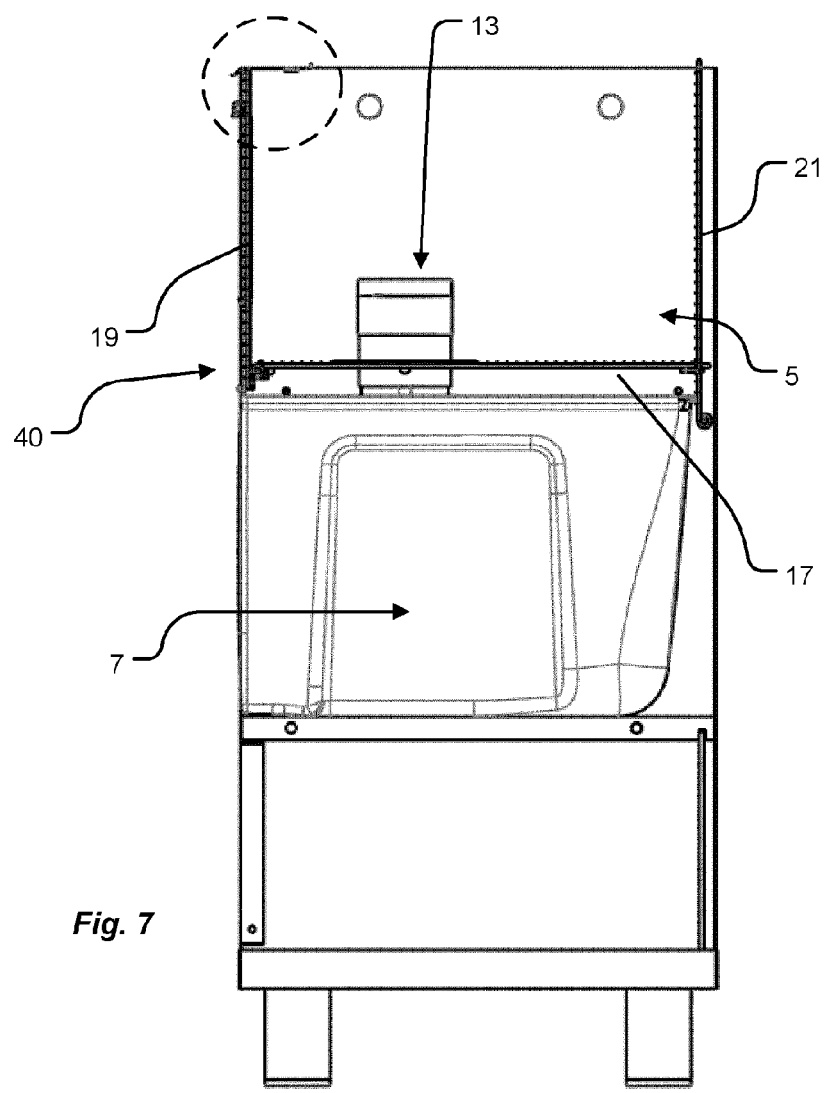
FIG. 7 is a schematic cross-sectional view through the enclosure along the line A-A of FIG. 1.
Figure 7A:
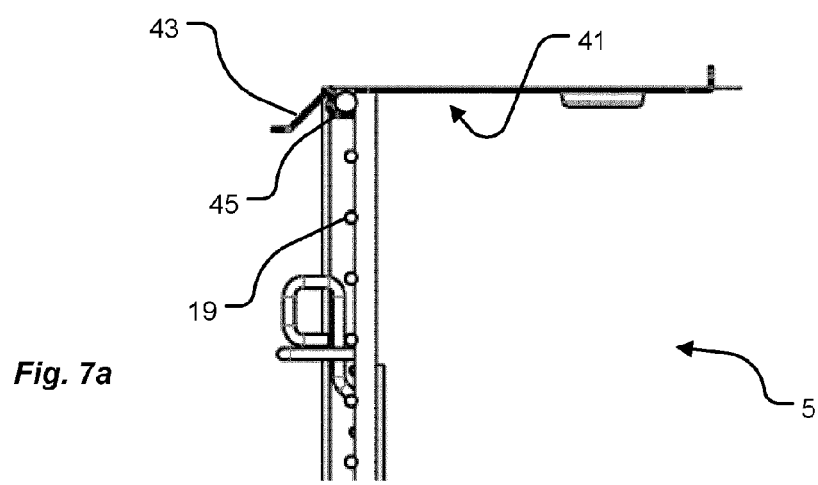
FIG. 7a is an enlarged view of part of FIG. 7.
Figure 7B:
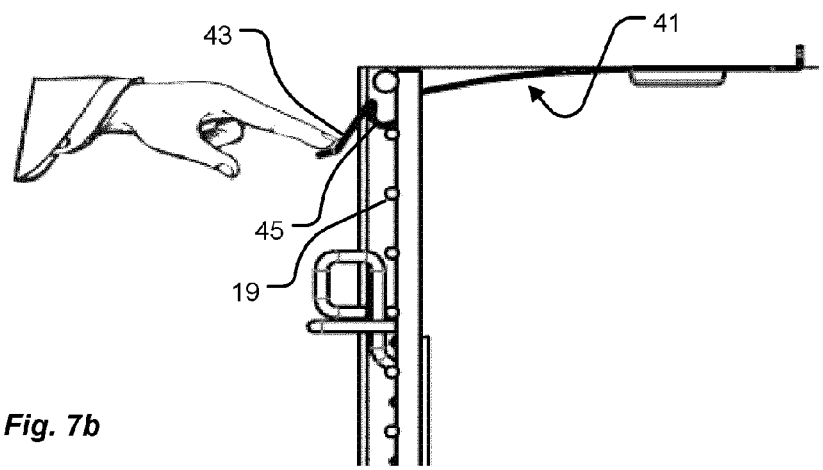
FIG. 7b is an enlarged view of the part of FIG. 7 depicted in FIG. 7a in a different state of operation.

FIG. 7 is a schematic cross-sectional view of the enclosure along the line A-A in FIG. 1, and FIG. 7a is an enlarged view of the region within the dashed circle in FIG. 7. The front wall 19 is pivotally mounted to the floor 17 at a pivot point 40 offset from the edge of the front wall, and can pivot from the position shown in FIG. 7 to through an angle of 90 degrees until the front wall 19 is parallel to the floor 17. Referring to FIG. 7a, a top wall 39 (FIG. 1) of the frame 3 has a flat spring locking mechanism 41 mounted to its underside to retain the front wall 19 approximately perpendicular to the floor 17. The locking mechanism 41 includes a tab portion 43 that projects through the front wall 19 when the front wall 17 is perpendicular to the floor 17, and a well 45 in which part of the front wall 19 locates to lock the front wall in a position perpendicular to the floor 17. As shown in FIG. 7b, to release the locking mechanism 41 a user need only press on the tab 43 whereupon the front wall disengages from the well 45. The front wall can then be pivoted towards the user about the floor 17. To relock the front wall 19, the user need only lift the wall back towards its perpendicular position whereupon the front wall automatically locates in the well 45 without the user having to press down on the tab 43.

Figure 8A:
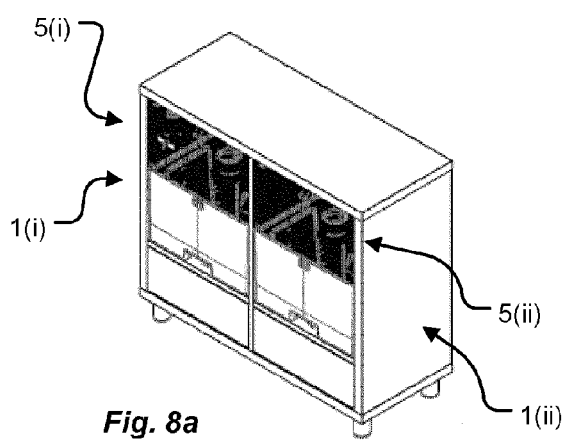
FIGS. 8a to 8c are schematic perspective views of different enclosure configurations.
Figure 8B:
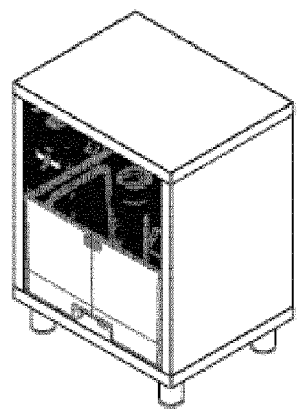
Figure 8C:
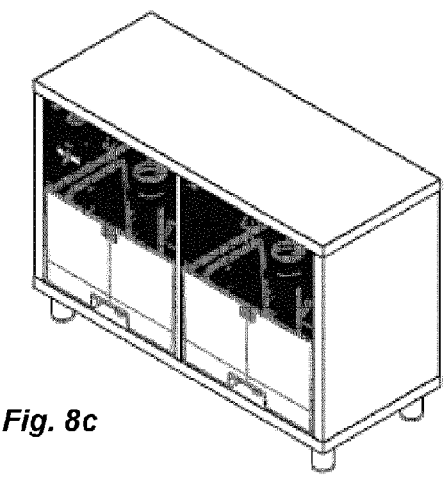

In the arrangement depicted in FIG. 1, the frame 3 includes an integral cupboard 47 closed by a door 49 that is kept closed by a magnetic "push open/push close" catch (not visible). In an alternative arrangement shown in FIG. 8a, a pair of enclosures 1(i) and 1(ii) are provided side-by-side, and in this arrangement a pluggable opening may be provided between adjacent first regions 5(i) and 5(ii). In alternative arrangements depicted schematically in FIGS. 8b and 8c, the integral cupboard may be omitted.

It will be appreciated that whilst various aspects and arrangements implementing the teachings of the present invention have heretofore been described, the scope of the present invention is not limited to the particular arrangements set out herein and instead extends to encompass all arrangements, and modifications and alterations thereto, which fall within the spirit and scope of the appended claims.

For example, whilst in the preceding arrangements the passageway comprises a moveable tube, it will be appreciated that many different arrangements are possible. For example, the passageway could comprise a ladder that is pivotally attached to the floor 17 and is movable from a position where the ladder hangs from the floor 17 into the second region 7 to a position where the ladder is generally parallel to the floor 17 and engages (for example, magnetically) the underside of the floor 17 to close off the first region from the second. In this configuration, withdrawal of the compartment that forms the second region 7 causes the ladder to pivot upwards to couple to the floor 17. A release mechanism is provided to decouple the ladder from the floor once the compartment has been returned to the frame.

It should also be noted that whilst the accompanying claims set out particular combinations of features described herein, the scope of the present invention is not limited to the particular combinations hereafter claimed, but instead extends to encompass any combination of features herein disclosed.

The invention claimed is:

1. An enclosure for small animals, the enclosure comprising:
   an internal wall that divides a space within said enclosure into first and second regions, and
   a passageway mounted in an opening defined in said internal wall to extend between said regions so that an animal within the enclosure can pass between the first and second regions of said space;
   wherein said passageway is movable relative to said internal wall between a first operating mode in which an animal within the enclosure is able to pass between said regions and a second operating mode in which the animal is obstructed from passing between said regions; and
   wherein the internal wall is provided with a first part of a two part engagement mechanism and said passageway is provided with a groove defined in an outer wall of said passageway thereby forming a second part of said two part engagement mechanism.

2. The enclosure according to claim 1, wherein an animal within the enclosure may traverse the passageway to pass between said first and second regions when the passageway is in said first operating mode.

3. The enclosure according to claim 1, wherein said passageway comprises an axial bore through which an animal may pass when the passageway is in said first operating mode.

4. The enclosure according to claim 1, wherein the passageway is suspended from the wall that divides said space into said first and second regions.

5. The enclosure according to claim 4, wherein the passageway is able to slide through said internal wall as it moves between said first and second operating modes.

6. The enclosure according to claim 4 wherein said passageway is able to pivot relative to said internal wall as it moves between said first and second operating modes.

7. The enclosure according to claim 1, wherein the first region is above said second region when the enclosure is in an upright orientation.

8. The enclosure according to claim 1, wherein the passageway extends substantially vertically between the first and second regions.

9. The enclosure according to claim 1, wherein:
   i) in the first operating mode the passageway extends further into the second region than into the first region; and
   ii) in the second operating mode the passageway extends further into the first region than into the second region.

10. The enclosure according to claim 1, wherein said internal wall defines a lower part of the first region and an upper part of the second region.

11. The enclosure according to claim 1, wherein said groove is substantially L-shaped.

12. The enclosure according to claim 1, wherein the passageway is substantially tubular in shape.

13. The enclosure according to claim 1, wherein the passageway comprises a plurality of separable parts.

14. The enclosure to claim 13, wherein the separable parts of the passageway are held together by one or more rings.

15. The enclosure according to claim 1, wherein an interior surface of the passageway is provided with one or more ribs.

16. The enclosure according to claim 1, wherein the first region is at least partly defined by a frame that defines the space in which said internal wall is located.

17. The enclosure according to claim 1, wherein said enclosure comprises a removable compartment located in said second region and into which said passageway extends when the passageway is in said first operating mode.

18. The enclosure according to claim 17, wherein said removable compartment cannot be removed from the enclosure until the passageway has been moved to its second operating mode.

19. The enclosure according to claim 1, wherein said internal wall is at least partly formed from a grill or mesh.

20. An enclosure for small animals, the enclosure comprising:
   an internal wall that divides a space within said enclosure into first and second regions, and
   a passageway mounted in an opening defined in said internal wall to extend between said regions so that an animal within the enclosure can pass between the first and second regions of said space;
   wherein said passageway is movable relative to said internal wall between a first operating mode in which an animal within the enclosure is able to pass between said regions and a second operating mode in which the animal is obstructed from passing between said regions; and
   wherein the internal wall is provided with a collar secured in the opening in said internal wall having a first part of a two part engagement mechanism and said passageway is provided with a second part of said two part engagement mechanism;
   wherein:
   i) in a first configuration of the two part engagement mechanism the passageway is able to be rotated relative to said internal wall, and
   ii) in a second configuration of the two part engagement mechanism the passageway is restricted from being rotated relative to said internal wall.

21. The enclosure according to claim 20, wherein the passageway is substantially tubular in shape.

22. The enclosure according to claim 20, wherein an interior surface of the passageway is provided with one or more ribs.

23. The enclosure according to claim 20, wherein said enclosure comprises a removable compartment located in said second region and into which said passageway extends when the passageway is in said first operating mode.

24. The enclosure according to claim 20, wherein said passageway is able to pivot relative to said internal wall as it moves between said first and second operating modes.

25. An enclosure for small animals, the enclosure comprising:
   an internal wall that divides a space within said enclosure into first and second regions, and
   a passageway mounted in said internal wall to extend between said regions so that an animal within the enclosure can pass between the first and second regions of said space, said passageway comprising a planar panel that is pivotally coupled at one end to said internal wall, said panel being moveable to open or close an aperture in said wall; and wherein said passageway is movable relative to said internal wall between a first operating mode in which an animal within the enclosure is able to pass between said regions and a second operating mode in which the animal is obstructed from passing between said regions.

* * * * *